UNITED STATES PATENT OFFICE.

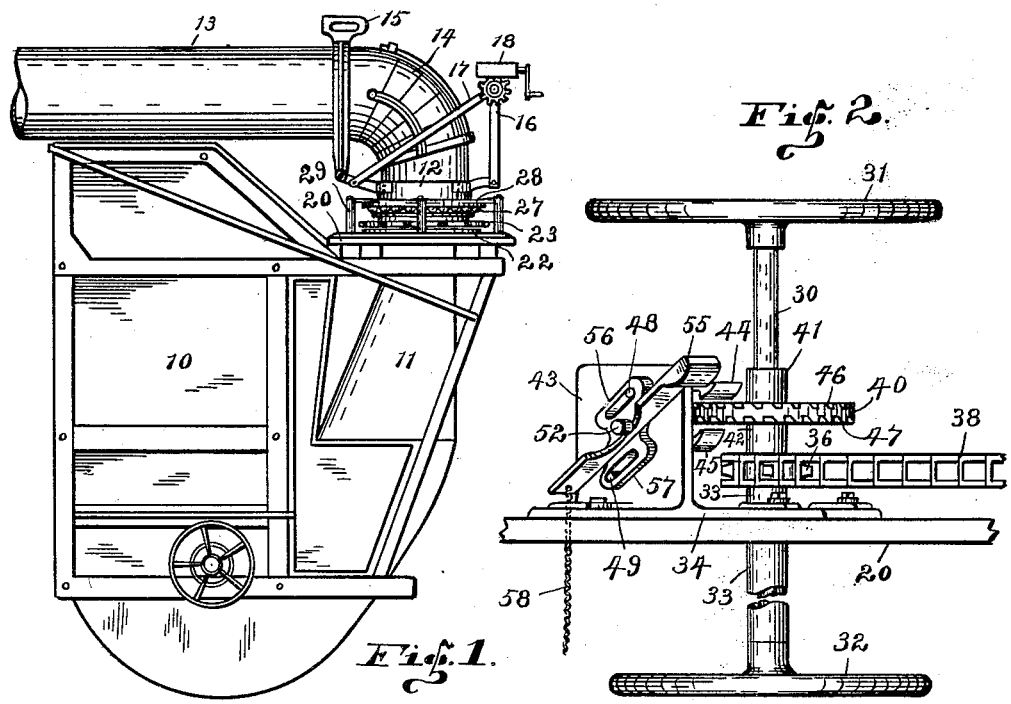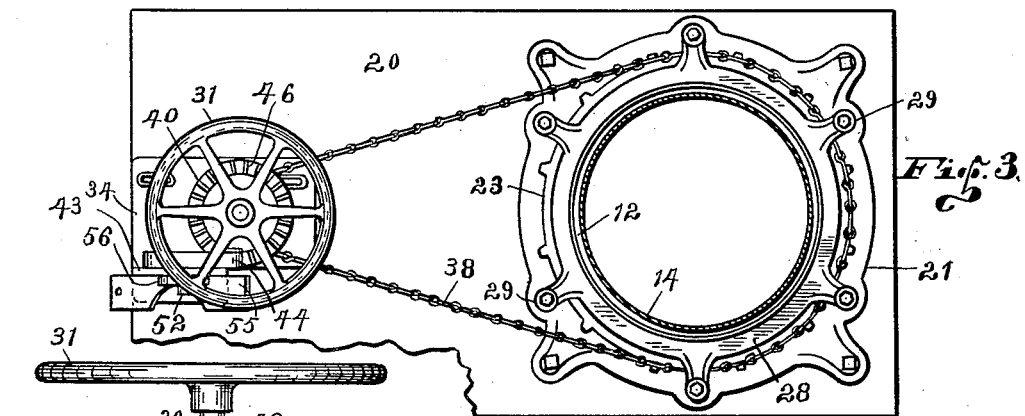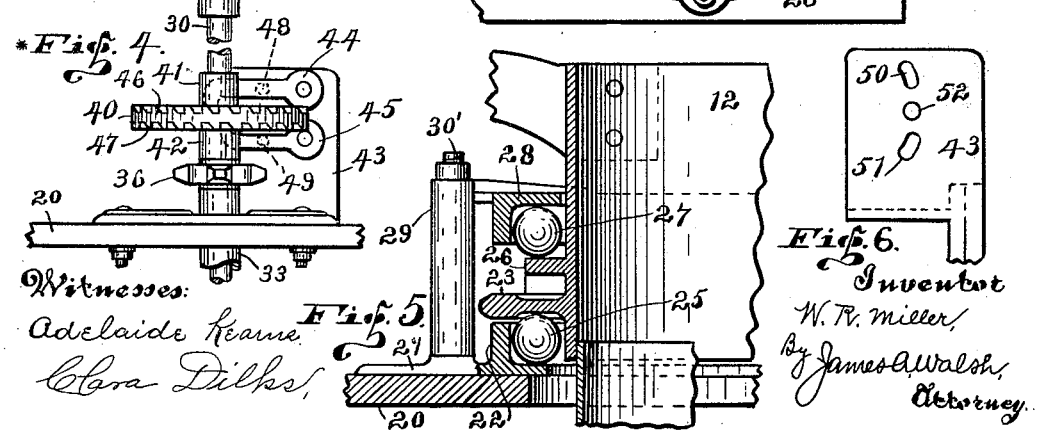

WILLIAM RUSSELL MILLER, OF HAMILTON, ONTARIO, CANADA, ASSIGNOR TO THE INDIANA MANUFACTURING COMPANY, OF INDIANAPOLIS, INDIANA, A CORPORATION OF WEST VIRGINIA.

PNEUMATIC STACKER.

1,000,032.  Specification of Letters Patent.  Patented Aug. 8, 1911.

Application filed December 12, 1910. Serial No. 596,867.

*To all whom it may concern:*

Be it known that I, WILLIAM R. MILLER, a subject of the King of Great Britain, residing at Hamilton, in the county of Wentworth and Province of Ontario, Canada, have invented certain new and useful Improvements in Pneumatic Stackers, of which the following is a specification.

My present invention relates to improvements in pneumatic stackers, and particularly to means for horizontally swinging the chute thereof, which consists in certain details of construction and arrangements of parts whereby I am enabled to mount the chute in such manner as to permit of its ready revolution, and whereby the same may be revolved and locked in predetermined position by an operator on or off the threshing machinery, all as will be hereinafter more fully explained.

In the accompanying drawings, which form a part hereof, Figure 1 is a side elevation of a pneumatic stacker embodying my invention; Fig. 2, a perspective of the chute revolving mechanism; Fig. 3, a plan showing the platform of the machine in fragment with my improvements arranged thereon; Fig. 4 a side elevation of the chute-revolving mechanism; Fig. 5, a detail sectional view of a portion of the chute and its bearings; and Fig. 6, a detail of a portion of the chute-revolving mechanism shown in Figs. 2 and 4.

In said drawings, the portions marked 10 represent the stacker chamber, 11 the fan-boot or outlet, 12 the revolving section of the chute with which said boot 11 communicates, 13 the main stacker chute, 14 the flexible elbow connecting said section 12 and chute 14, and 15, 16, 17, 18, the chute elevating and lowering devices, common to the type of stacker illustrated.

At one side of the platform, 20, which lies transversely of the rear end of the separator, I secure a base plate, 21, by bolts or otherwise, which plate is provided with an annular ball retainer, 22, (Fig. 5). The revolving chute section 12 I provide with a sprocket, 23, which, when the structure is assembled, lies above the ball retainer 22, so that a series of balls, 25, may be thus inclosed to form an anti-friction bearing for the lower portion of said section 12. An external rib, 26, is formed on said section 12 above sprocket 23, upon which another series of balls, 27, are placed, and are held in position by a ring-cap, 28, which cap through standards, 29, is securely connected to base plate 21 by means of bolts, 30', all as plainly indicated in Fig. 5. By the arrangement thus described the revolving chute section is provided with two ball races, which permit it to be freely and readily turned with but slight power. To the opposite side of platform 20 I secure my chute turning device, comprising a shaft, 30, having cranks or hand-wheels, 31, 32, at the upper and lower ends thereof, and which shaft is preferably secured in a collar, 33, associated with a reinforcing plate, 34, bolted or otherwise secured to platform 20. Above said collar 33 I place a sprocket, 36, which is in alinement with sprocket 23, and which sprockets I connect with a chain 38. Also on said shaft I mount a disk, 40, which may embody hubs, 41, 42, as shown in Fig. 2, and which disk is toothed on its upper and lower sides. At one side of said disk I secure an upright plate, 43, to which is pivotally connected pawls, 44, 45, adapted to engage the ratchet teeth 46, 47, of said disk. Said pawls are provided with pins, 48, 49, respectively, which pass through slots, 50, 51, in plate 43. On the opposite side of said plate between said slots is a pin 52, upon which is pivotally mounted a treadle, 55 (Fig. 2), comprising slotted members 56, 57, in which the pawl pins 48, 49, respectively, are guided, and which treadle may also be manipulated by an operator on the ground by means of a wire or rod, 58, passing through platform 20.

In the operation of my improved turning mechanism, the stacker chute may be swung from side to side by an operator either on the machinery or on the ground, who may depress the treadle 55 by foot pressure when on the machine, or by pulling on the wire or rod 58 when off the machine, which unlocks the pawls 44, 45, and permits the ready turning of shaft 30 by whichever of the hand-wheels, 31, 32, is most convenient. Such rotation of the shaft, as will be understood, imparts motion to sprocket 36, thence to chain 38, which latter in turn actuates sprocket 23 to revolve the stacker chute so that it may be swung in any desired horizontal direction, and by reason of the two sets of ball bearings on which it is mounted this operation is performed with minimum friction. When it is desired to hold the stacker chute stationary in a predetermined position it is but necessary to depress the treadle forwardly which through its slotted members shifts the pawl pins extending through plate 43, causing them to draw the upper and lower pawls into positive engagement with toothed disk 40 and thus lock the turning mechanism, so that the stacker chute is prevented from turning until said pawls are released by reversing the movement of said treadle whereby the pawls are thrown out of engagement with said disk. By this arrangement I provide a simple and effective turning and locking device for stacker chutes, which is simple and positive in operation and which is within convenient control of an operator whether on or off the machine.

I claim as my invention:

1. The combination, with a pneumatic stacker chute, of a sprocket, anti-friction bearings arranged externally of said chute at opposite sides of said sprocket, a vertical shaft arranged in proximity to said chute and having operating means at its upper and lower ends, a sprocket on said shaft, a chain connecting said sprockets, a disk on said shaft toothed on its upper and lower faces, pawls mounted on each side of said disk, means for pivotally supporting said pawls, and means for actuating said pawls to engage or disengage said disk to prevent or permit the turning of said shaft and chute.

2. The combination, with a pneumatic stacker chute, of a revolving chute section, a sprocket connected thereto, anti-friction bearings arranged externally of said section, a shaft arranged in proximity to said chute and having operating means at its upper and lower ends, a sprocket on said shaft, a chain connecting said sprockets, a disk on said shaft having teeth in its upper and lower faces, locking means adapted to engage said disk, and means for operating said locking means.

3. In a pneumatic stacker, a revolving chute, a shaft adjacent said chute having operating means at its upper and lower ends, a chain connecting said shaft and said chute, a disk on said shaft, a supporting plate adjacent said disk, pawls pivotally connected to said plate and having pins projecting therethrough, and a slotted treadle on said plate engaging said pins for throwing said pawls into and out of engagement with said disk whereby said shaft may be permitted to or prevented from rotating to swing or maintain said chute in predetermined position.

4. In a pneumatic stacker, a revolving chute, a sprocket on said chute, a shaft having a sprocket mounted thereon, a chain connecting said sprockets, a crank-wheel for rotating said shaft to revolve said chute, a toothed disk on said shaft, pawls engaging the upper and lower sides of said disk, and means for operating said pawls to prevent or permit the rotation of said shaft.

In testimony whereof I affix my signature in presence of two witnesses.

WILLIAM RUSSELL MILLER.

Witnesses:
MAE HEWSON,
REBA MEYERS.

---

Copies of this patent may be obtained for five cents each, by addressing the "Commissioner of Patents, Washington, D. C."